United States Patent [19]

Heibel et al.

[11] Patent Number: 5,209,503
[45] Date of Patent: May 11, 1993

[54] HOT GAS ELASTIC JOINT SEAL

[75] Inventors: Jürgen Heibel, Frankfurt am Main; Peter Brinkmann, Maintal; Peter Schmäing, Frankfurt am Main, all of Fed. Rep. of Germany

[73] Assignee: Metallgesellschaft Aktiengesellschaft, Frankfurt am Main, Fed. Rep. of Germany

[21] Appl. No.: 855,908

[22] Filed: Mar. 23, 1992

[30] Foreign Application Priority Data

Mar. 23, 1991 [DE] Fed. Rep. of Germany ....... 4109637

[51] Int. Cl.$^5$ .............................................. F16J 15/32
[52] U.S. Cl. ........................................ 277/229; 52/395;
52/573; 277/230; 277/227; 285/47; 285/224
[58] Field of Search ............. 277/227, 229, 230, 231,
277/232; 52/573, 395, 396; 285/47, 53, 224, 235

[56] References Cited

U.S. PATENT DOCUMENTS

| 3,460,856 | 8/1969 | Van Tine et al. | 285/53 |
| 4,063,755 | 12/1977 | Merz | 285/53 |
| 4,140,338 | 2/1979 | Kazmierski, Jr. et al. | 285/53 |
| 4,441,726 | 4/1984 | Uhl | 277/230 |
| 4,747,624 | 5/1988 | Faber et al. | 277/230 |
| 4,848,803 | 7/1989 | Bachmann | 285/47 |
| 4,942,710 | 7/1990 | Rumsey | 52/396 |

FOREIGN PATENT DOCUMENTS

3501059A1  8/1986  Fed. Rep. of Germany .

*Primary Examiner*—William A. Cuchlinski, Jr.
*Assistant Examiner*—Daniel G. DePumpo
*Attorney, Agent, or Firm*—Herbert Dubno

[57] ABSTRACT

The seal is provided at a joint between two ducts, which are traversed by hot gases. It has a seat for the seal and an elastic compensator strip, which spans the gap between the two ducts. A woven wire cloth is provided under the compensator strip. A metal foil is provided over the woven wire cloth and a packing of ceramic fibers is provided over the metal foil. A seat member for the seal is joined to each of the two ducts. Each seat member is provided with a row of pointed rods of metal, which extend through the woven wire cloth, the metal foil and the packing of ceramic fibers.

4 Claims, 2 Drawing Sheets

HOT GAS ELASTIC JOINT SEAL

FIELD OF THE INVENTION

Our present invention relates to a seal at an expansion joint between two ducts traversed by hot gases. More particularly the invention deals with a seal which comprises a compensator strip joined to both ducts and spanning a seat for the seal and constituting the outside surface of the seal at the joint. The hot gases may have been produced, e.g. by the combustion or gasification of solid, liquid or gaseous fuels or by a calcination of solids.

BACKGROUND OF THE INVENTION

Expansion joints are required between, for example, two duct sections traversed by hot gases, between conduits or the like forming part of chemical or metallurgical process equipment or systems in which expansion and contraction phenomena mandate some mobility in the joint, and wherever a gas-tight joint is required and where corrosion or aggressive attack on the joint is a problem.

In all of these cases, elastomeric materials, which can normally span a fluid-tight joint between two duct members cannot be used because the high temperatures and aggressive nature of the gases would cause deterioration of the seals. Conventional labyrinth seals also cannot be used where truly gas tight joints are required and release of gas to the environment is undesirable or a potential problem.

OBJECTS OF THE INVENTION

It is an object of the invention to provide a joint with a seal which permits the ducts to have a simple design at the joint and which is as durable as possible and requires a minimum of maintenance.

Yet another object of the invention is to provide an improved seal for duct systems traversed by hot gases and which will allow relative movement of the duct sections connected by the joint with a minimum of joint maintenance.

Another object of this invention is to provide a joint seal for hot gas ducts which is not significantly affected by even corrosive gases and can maintain a seal for long periods of time.

Yet another object of this invention is to provide an improved joint seal for a hot gas duct which is inexpensive and free from drawbacks of earlier seals.

SUMMARY OF THE INVENTION

The joint seal can comprise on a woven wire cloth a metal foil and over the metal foil a packing of ceramic fibers.

Owing to the woven wire cloth, the seal is stable at the joint. The metal foil ensures a substantially gas tight connection. The packing of ceramic fibers is heat insulating and withstands even high temperatures. These materials permit the ducts to move.

For the fixation of the seal at the joint in the seat for the seal, pointed rods of metal are suitably joined to the seat for the seal and extend through the woven wire cloth, the metal foil and the packing of ceramic fibers so that an undesired shifting of the seal in the seat will be prevented.

According to a feature of the invention a wire net is provided on the packing of ceramic fibers. In addition, a mineral wool layer is advantageously provided between the compensator strip and the packing of ceramic fibers.

According to a feature of the invention, therefore, the seal of the present invention can be provided between duct sections in an apparatus for the combustion of solid fuels and can bridge the two duct sections at a mobile joint. The seal can comprise a pair of annular seat members which can be welded to the outer shells of the duct sections and can extend inwardly to be set into the ceramic or refractory linings of the duct sections and outwardly to accommodate the packing of the joint seal. The inner edges of the seat forming members can reach toward one another and are spanned by an inner metal screen which lines at least the inner seat members. This layer of woven wire cloth can span the gap between the seats.

Outwardly of the metal wire fabric and functioning as a gas-impermeable material lying directly thereagainst, is a metal foil made, for example, of steel. The steel foil may be substantially coextensive with the annular strip of wire fabric. The woven wire fabric may be made of steel thread, preferably, stainless steel filament. Outwardly of the metal foil and bridging between the two seats is a packing of the ceramic fibers which preferably are aluminosilicate fibers.

Also bridging the seats and delimiting the outer boundary of aluminosilicate fibers, is a wire net or mesh, preferably of stainless steel wire which, in turn, is surrounded by one or more layers of mineral wool forming another packing outwardly of the wire net.

The seats can have flanges extending away from one another and serving as anchorages for the edges of a compensating strip which can bulge inwardly or outwardly, preferably outwardly, so that it can flex with movement of the seats axially toward and away from on another. The mineral wool packing can completely fill the space between the metal mesh and the compensator strip.

Preferably the packings are held in place by being transfixed with radial rods as have been described, welded to the inwardly turned portions of the seats and extending radially outwardly therefrom through the inner wire fabric, the metal foil, the packings and the wire mesh and, if desired through the holes preformed in metal stabilizers welded to the outwardly extending walls of the seats, extending transversely thereto and formed with holes through which the individual rods or pins pass.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

In plants for combusting, gasifying or calcining, the high operating temperatures of, e.g., 800° to 1400° C. of equipment lines with refractories will result in different expansion at the connecting ducts so that differential expansions in the axial and lateral directions will occur and will require joints to be provided between the various parts. Each joint must be provided with a seal that has elastic properties.

Figure 1:
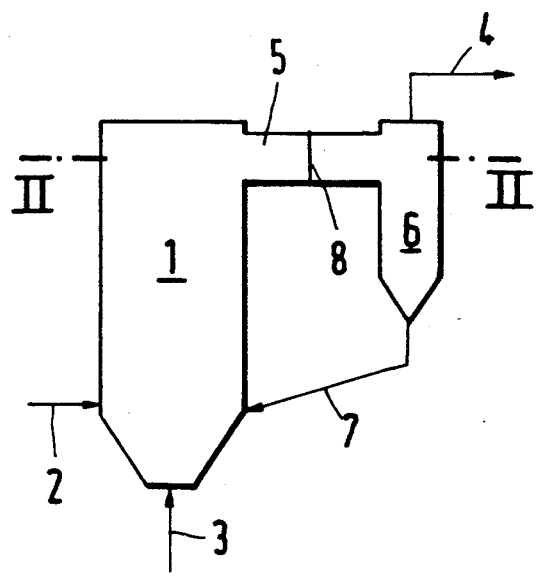
FIG. 1 is a schematic diagram showing a combustion apparatus provided with the seal.

The schematic FIG. 1 shows a apparatus for combusting solid fuels in a circulating fluidized bed. The fluidized bed combustion chamber 1 is supplied with granular solid fuels through line 2 and with fluidizing and combustion air through line 3. Solids-laden combustion gases flow through a duct 5 to a cyclone separator 6, in which a major part of the solids is removed and is then recycled through line 7 to the fluidized bed combustion chamber 1. Low-solids combustion gases leave the cyclone 6 through the line 4 and are then cooled and purified further.

Figure 2:
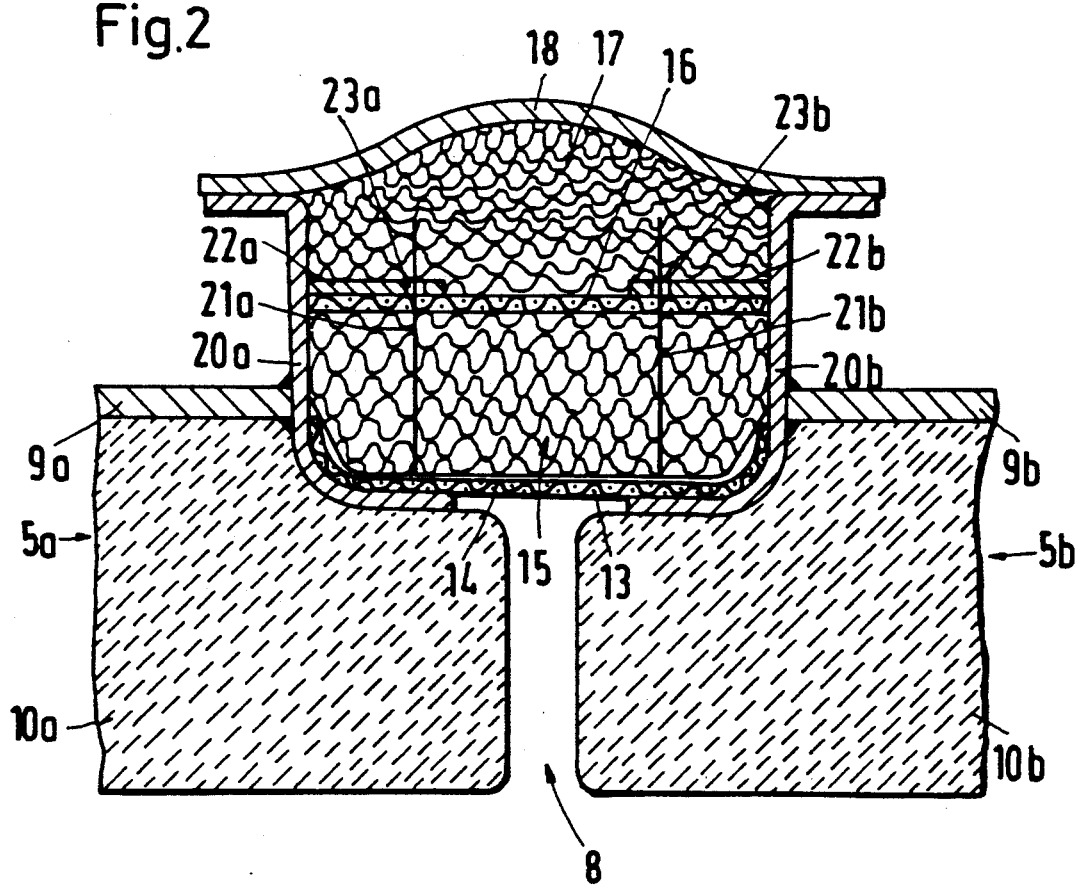
FIG. 2 is an enlarged sectional view taken along line II—II in FIG. 1 and showing a seal at a joint.
Figure 3:
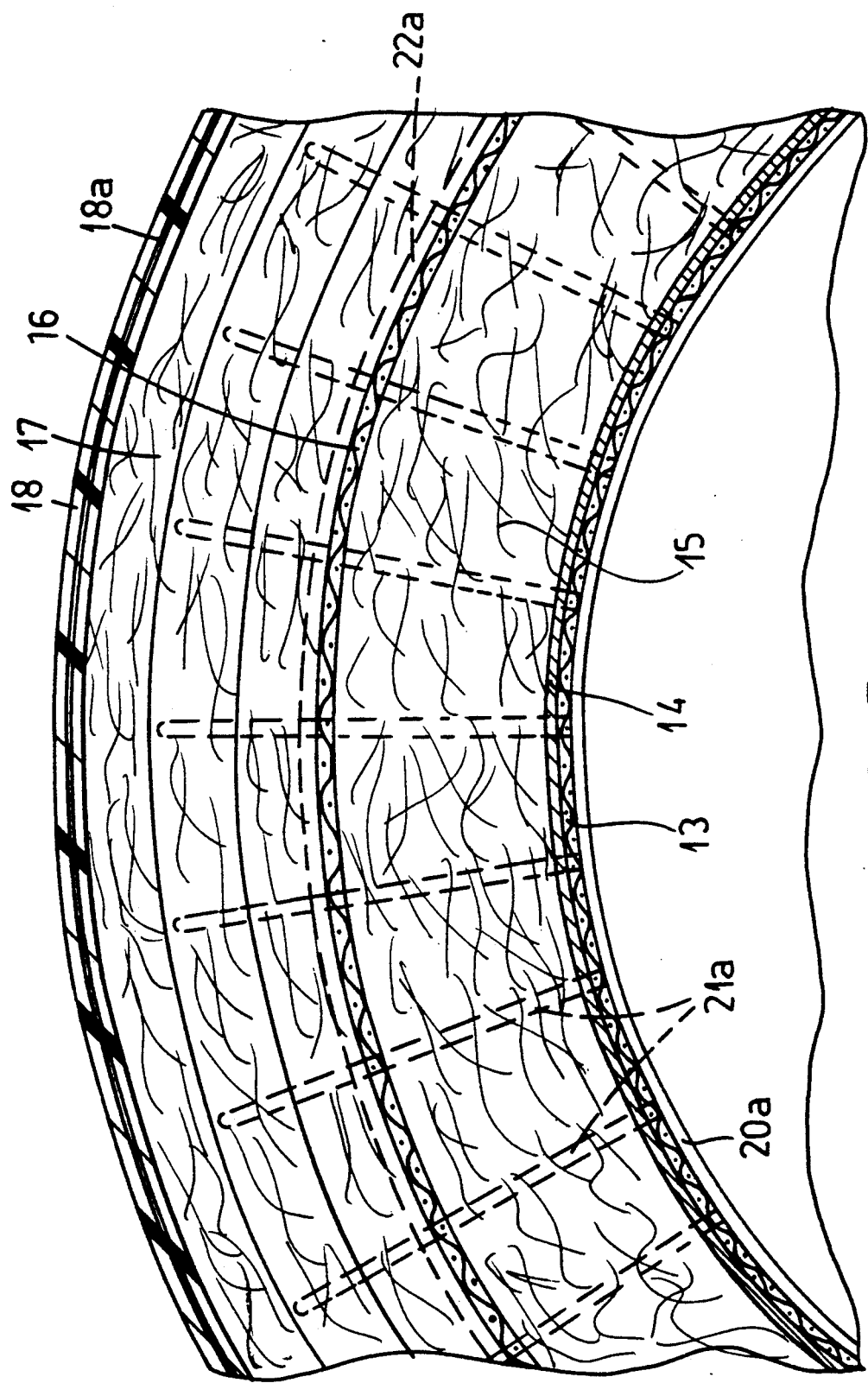
FIG. 3 is a transverse section through the seal of FIG. 2.

The parts of the apparatus shown in FIG. 1 are provided on the inside with a protective lining, e.g. of a ceramic or refractory composition. For this reason the duct 5 must be divided into two sections by a joint 8, which must be provided with a seal. An embodiment of the seal at the joint is shown in FIGS. 2 and 3.

There is an expansion joint 8 between the duct sections 5a and 5b. The ducts comprise steel shells 9a and 9b and internal linings 10a and 10b. The seal at the joint consists of a woven wire cloth 13, a metal foil 14 made, e.g., of steel, a packing 15 of ceramic fibers, such as aluminosilicate fibers, a wire net 16, a mineral wool layer 17, and a compensator strip 18.

The elastic compensator strip 18 constitutes the outside surface of the seal and may consist, e.g. of plastic and may comprise an embedded wire layer. The strip is a commercially available product.

The seat for the seal is constituted by two angled sheet steel elements 20a and 20b, which are welded to the steel shells 9a and 9b, respectively.

The compensator strip 18 is joined to the two sheet steel elements 20a and 20b by means which are not shown and may consist, e.g., of screws.

A row of pointed rods 21a or 21b are welded to each sheet steel element. Only one pointed rod of each row is shown in FIG. 2. The pointed rods arranged in rows extend through the wire mesh 13, the steel foil 14, the packing 15, the wire net 16 and part of the mineral wool layer 17. The pointed rods 21a and 21b arranged in rows hold the seal in position in the seat constituted by the angled sheet metal elements 20a and 20b. As can be seen from FIG. 3, the pointed rods may extend radially in angularly equispaced relationship.

The stability of the rows of pointed rods is ensured by retaining plates 22a and 22b of metal, which have holes 23a and 23b, through which the pointed rods extend. As the seal is assembled at the joint, the retaining plates will be inserted after the wire net 16 has been penetrated by the pointed rods and before the mineral wool layer 17 and the compensator strip 18 have been applied. The retaining plates 23a and 23b are welded to one of the angled sheet metal elements 20a and 20b.

The packing 15 of ceramic fibers may be composed of a plurality of layers, just as is the mineral wool layer 17. As is apparent from FIG. 2, the joint 8 defines below the woven wire cloth 13 an open space, through which the hot gas flowing in the ducts can flow in and out. Because the boundaries of the space in the joint are substantially smooth, no disturbing crusts will be formed there by the entrained solids.

We claim:

1. A joint seal between two ducts traversed by hot gas, comprising:
respective seats formed on each of said ducts at a joint between said ducts, each seat comprising an angled metal element;
a woven wire cloth bridging said seats and said metal elements;
a metal foil disposed on said wire cloth;
a packing of ceramic fibers spanning said seats and being disposed on said metal foil;
a wire net disposed on said packing of ceramic fibers;
a mineral wool layer disposed on said wire net;
a respective retaining plate welded to at least one of said angled metal elements and provided with throughgoing holder;
a plurality of pointed metal rods secured to each seat and extending radially therefrom through said wire cloth, said metal foil, said packing of ceramic fibers and said wire net, said metal rods extending through said holes in said retaining plate; and
a compensator strip at the outside of said seal and spanning said seats while enabling relative movement of said seats.

2. The joint seal defined in claim 1, wherein said rods extend into said mineral wool layer.

3. The joint seal defined in claim 2, wherein said seats are composed of metal liners welded to said ducts.

4. The joint seal defined in claim 3 wherein a respective one of said retaining plates is provided on each of said seats and has holes traversed by a respective row of said rods secured to each said seat.

* * * * *